(12) United States Patent
Limousin et al.

(10) Patent No.: US 11,572,103 B2
(45) Date of Patent: Feb. 7, 2023

(54) ROCKER STRUCTURE FOR A VEHICLE AND METHOD FOR OBTAINING THEREOF

(71) Applicant: AUTOTECH ENGINEERING, S.L., Bizkaia (ES)

(72) Inventors: Victor Nicolas Simon Limousin, Bizkaia (ES); Unai Lopategi Sanz, Bizkaia (ES); Quentin Benjamin Giraud Du Poyet, Bizkaia (ES)

(73) Assignee: Autotech Engineering, S.L., Bizkaia (ES)

( * ) Notice: Subject to any disclaimer, the term of this patent is extended or adjusted under 35 U.S.C. 154(b) by 139 days.

(21) Appl. No.: 17/309,466

(22) PCT Filed: Dec. 27, 2019

(86) PCT No.: PCT/EP2019/087107
§ 371 (c)(1),
(2) Date: May 28, 2021

(87) PCT Pub. No.: WO2020/136265
PCT Pub. Date: Jul. 2, 2020

(65) Prior Publication Data
US 2021/0371012 A1 Dec. 2, 2021

(30) Foreign Application Priority Data
Dec. 28, 2018 (EP) .................................... 18383007

(51) Int. Cl.
*B62D 25/02* (2006.01)
*B62D 21/15* (2006.01)
(Continued)

(52) U.S. Cl.
CPC ......... *B62D 25/025* (2013.01); *B62D 21/157* (2013.01); *B62D 27/02* (2013.01);
(Continued)

(58) Field of Classification Search
CPC ... B62D 25/025; B62D 21/157; B62D 27/023
(Continued)

(56) References Cited

U.S. PATENT DOCUMENTS

2016/0257344 A1 9/2016 Hasegawa

FOREIGN PATENT DOCUMENTS

| DE | 10003878 A1 | 8/2001 |
| DE | 102005038463 A1 | 2/2007 |
| DE | 102014113403 A1 | 3/2016 |

OTHER PUBLICATIONS

International Search Report for International Application No. PCT/EP2019/087107, dated Apr. 9, 2020 (3 pages).
(Continued)

*Primary Examiner* — Dennis H Redder
(74) *Attorney, Agent, or Firm* — Finnegan, Henderson, Farabow, Garrett & Dunner LLP

(57) ABSTRACT

Rocker structure (R1-R3) for a vehicle comprising a first steel profile (1) and a second steel profile (2) having the longitudinal direction (L) of the vehicle so that a channel (CH) is defined therebetween, the first and second profiles(1, 2) comprising a vertical central section (13), the rocker structure (R1-R3) comprising a first impact absorption element (3) arranged in the channel (CH), wherein the first impact absorption element (3) is a closed steel profile wherein an upper lobe (31) and a lower lobe (32) joined by a central joining section (33) are defined, the upper lobe (31) being located closer to the upper joining flanges (11, 21), the lower lobe (32) closer to the lower joining flanges (21, 22). The invention also relates to a method for obtaining the rocker structure and to vehicles provided with the inventive rocker structure.

15 Claims, 10 Drawing Sheets

(51) Int. Cl.
    *B62D 27/02*         (2006.01)
    *B62D 29/00*         (2006.01)
    *B23K 103/04*       (2006.01)
    *B23K 101/00*       (2006.01)
    *B60K 1/04*           (2019.01)

(52) U.S. Cl.
    CPC ...... *B62D 29/007* (2013.01); *B23K 2101/006* (2018.08); *B23K 2103/04* (2018.08); *B60K 1/04* (2013.01); *B60K 2001/0438* (2013.01)

(58) Field of Classification Search
    USPC .......................................... 296/209, 187.12
    See application file for complete search history.

(56) References Cited

OTHER PUBLICATIONS

Written Opinion of the International Searching Authority for International Application No. PCT/EP2019/087107, dated Apr. 9, 2020 (5 pages).

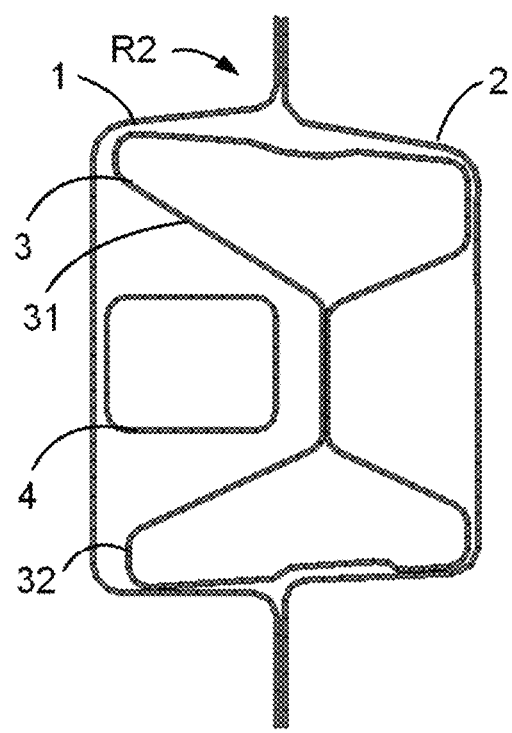
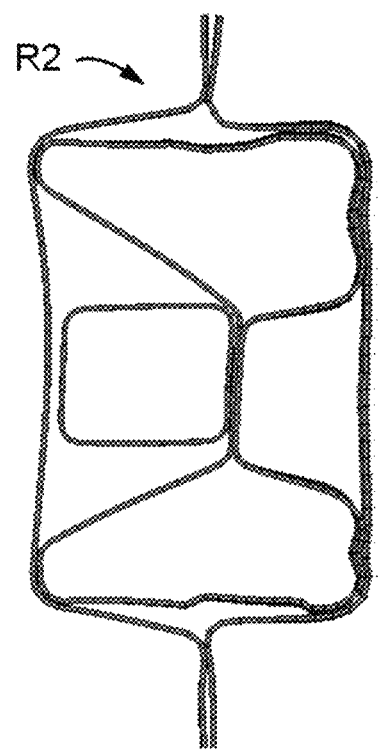
FIG. 6A  FIG. 6B
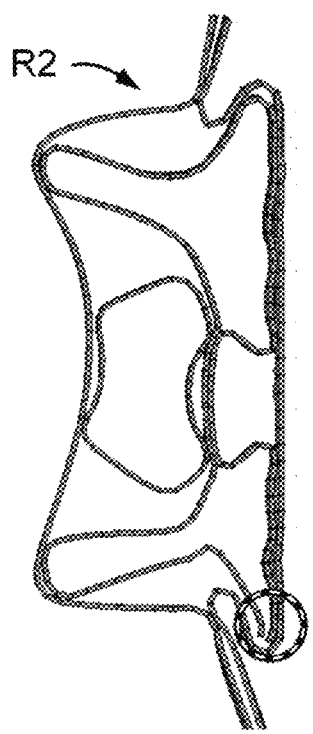
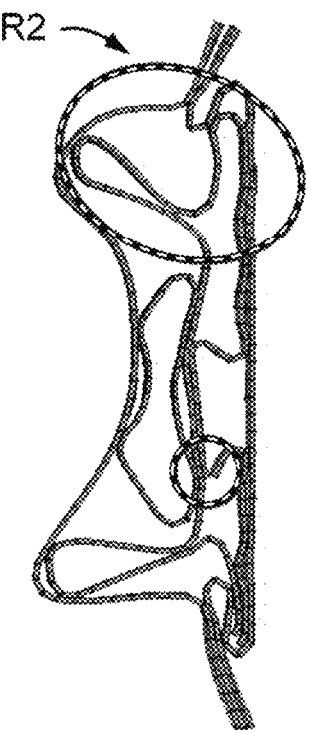
FIG. 6C  FIG. 6D  FIG. 6E

FIG. 9
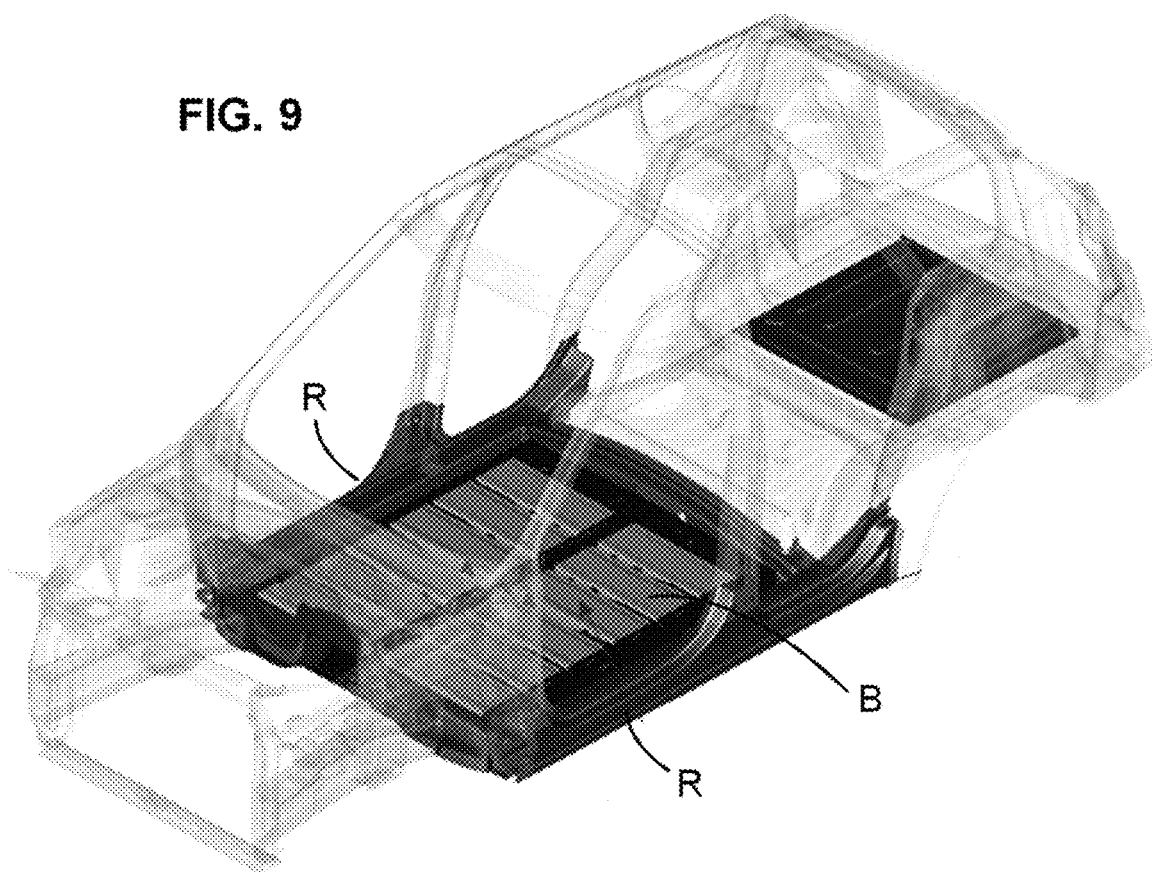
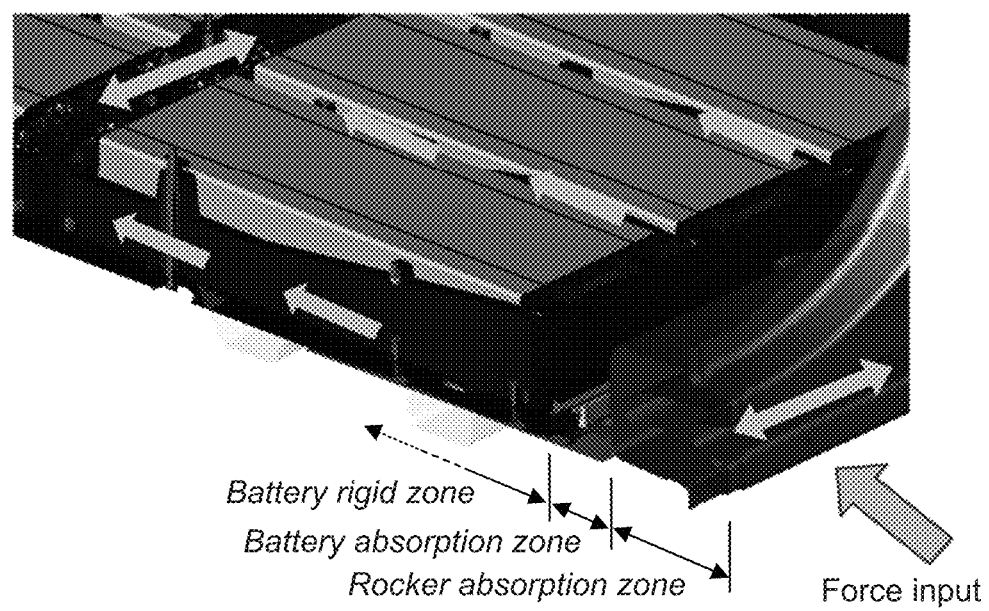
FIG. 10

ROCKER STRUCTURE FOR A VEHICLE AND METHOD FOR OBTAINING THEREOF

PRIORITY

This application is a U.S. national stage entry under 35 U.S.C. § 371 of International Application No. PCT/EP2019/087107, filed Dec. 27, 2019, which claims the benefit of priority from European Patent Application EP 18383007.4 filed Dec. 28, 2018, both of which are herein incorporated by reference in their entireties.

TECHNICAL FIELD

The present invention relates to the field of bodies in white for vehicles. More specifically, the present invention relates to a rocker structure that allows to better absorb impact energy with a rocker without reinforcement or have a similar level of absorbed energy with respect to a rocker with aluminum reinforcement, while reducing the manufacturing costs. It also relates to a method for obtaining the rocker structure.

STATE OF THE ART

Rocker structures are an important part of vehicles. These structures improve the safety of the vehicles and the passengers inside of the vehicles due to the combination of rigidity and stiffness and energy absorption capacity by plastic deformation they provide.

In order to provide such safety functions, a rocker structure must be mechanically designed so that it is capable of absorbing a large amount of energy when the vehicle impacts or crashes, in this way the interior of the vehicle does not collapse significantly and/or other parts of the structure of the vehicle do not break or get deformed because any of these events may endanger human life.

The importance of rocker structures is even greater in electric cars, e.g. electric vehicles (i.e. EV), plug-in hybrid electric vehicles (i.e. PHEV), and the like. This is so because in addition to the aforementioned safety of the people onboard (that no part or element hits a person in the cabin of the vehicle), the rocker structures are essential to avoid any damage to the battery cells of the cars, which are mainly arranged in the bottom-most part of the vehicle. Therefore, if the rocker structure cannot withstand the energy of the impact, part of the structure of the vehicle may collide with the battery cells thereby damaging them, which may cause leakage of material contained therein, release of gases that may also be at high temperatures, or even cause the explosion of battery cells, thereby further endangering the lives of the people onboard of the vehicle.

Notwithstanding the importance of rocker structures from a safety standpoint, the automotive industry always strives to reduce both the production cost of motor vehicles and the costs for operating the motor vehicles, the latter being the costs for the maintenance and the fuel necessary for driving the vehicles. Accordingly, if possible, the weight and the cost for manufacturing each and every part of the vehicles are to be reduced.

There have been attempts in the prior art to improve rocker structures. Some prior art rocker structures have been manufactured by means of aluminum extrusion, that leads to multi material assembly, which is more complex and expensive to join; compared to conventional processes (Remote Spot Welding, Remote Laser Welding).

U.S. Pat. No. 9,045,175-B2 describes a rocker structure formed by joining two shaped plate members so that the weight thereof is reduced. The two shaped plate members are joined so as to form an H-shaped structure for absorbing energy in the event of an impact or a crash.

Patent document DE-10003878-B4 describes a vehicle structure being provided with an additional element for reinforcing said vehicle structure. Particularly, the vehicle structure comprises an outer profile forming a cavity, and the additional element inside the cavity, which is an H-shaped inner profile. The additional element is glued to the outer profile for absorbing energy in the event of an impact or a crash.

Patent document EP-1122152-A2 discloses a structure including a reinforcing hollow structural member that is beam-shaped.

Patent document EP-2976250-B1 describes a structure for a vehicle that has a plurality of reinforcing members in the form of profiles that are inside a cavity of the structure.

There is an interest in providing a rocker structure that is suitable for vehicles, including electric vehicles, which is capable of absorbing a large amount of energy, which has a similar weight to a rocker with aluminum reinforcement, and whose production is cost-effective.

DESCRIPTION OF THE INVENTION

A first aspect of the invention refers to a rocker structure for a vehicle, in which a longitudinal direction, a transversal direction and a vertical direction are defined, so that the three directions are orthogonal to each other, the rocker structure comprising a first steel profile and a second steel profile, such that, when the rocker structure is mounted on the vehicle the profiles have the longitudinal direction, in each of the first and second profiles a concavity, an upper joining flange and a lower joining flange are defined, the profiles being joined therebetween by their upper and lower joining flanges so that a channel is defined between the two profiles, the first profile comprising a central section having substantially the vertical direction, the second profile comprising a central section having substantially the vertical direction, the rocker structure further comprising a first impact absorption element arranged in the channel, the first impact absorption element being a closed steel profile wherein an upper lobe and a lower lobe joined by a central joining section are defined, the upper lobe being located closer to the upper joining flanges, the lower lobe being located closer to the lower joining flanges.

A rocker structure according to the present disclosure features energy absorption capabilities that are suitable for motor vehicles in general, and also for electric vehicles and/or plug-in hybrid electric vehicles in particular, both of which usually include battery cells at the bottom-most part of the vehicle.

Manufacturing a rocker structure according to the present disclosure is simplified with respect to processes for manufacturing prior art rocker structures at least because the first impact absorption element is manufactured by shaping a tubular steel structure (e.g. by roll forming); this process is more cost-effective than extrusion, for instance. Further, as the first and second profiles are made of steel, the union thereof is also simplified, which also eases the manufacturing process.

Preferably, the upper lobe has a portion adjacent to the central section of the first steel profile, and the lower lobe has a portion adjacent to the central section of the first steel profile and a portion adjacent to the central section of the second steel profile.

In some embodiments, a portion of the upper lobe is adjacent to the central section of the second steel profile. In some of these embodiments, the portion of the upper lobe adjacent to the central section of the second steel profile has a section complementary to the second profile, said portion of the upper lobe being joined to the second steel profile.

In some embodiments, the portion of the lower lobe adjacent to the central section of the second steel profile has a section complementary to the second profile, said portion of the lower lobe being joined to the second steel profile.

The arrangement of portions of the lobes adjacent to the second steel profile, the provision of a section in said portions that is complementary to the second profile, and the joining of said portions to the second steel profile may each improve the union between the first impact absorption element and the second steel profile, thereby improving the energy absorbing capabilities of the rocker structure.

In some embodiments, each of the first and second profiles has a Ω-shaped (i.e. uppercase-omega-shaped) section.

In some embodiments, the central joining section is rectilinear and parallel to the central sections of the first and second profiles.

Such arrangement of the central joining section eases the joining on itself at said section, thereby further simplifying the production of the rocker structure. Joining together the two edges of the central joining section reinforces the lobes and, thus, the entire rocker structure.

In some embodiments, sections of the upper and lower lobes that join the central joining section to the portions adjacent to the central sections of the first and second steel profiles are rectilinear.

These sections make possible to transmit forces both in the transverse direction and the vertical direction during the impact and while the rocker structure is subject to deformation. The sections thus make possible to distribute the forces caused by the impact. In other words, it is possible to decompose the forces according to the transverse direction into forces that have a vertical component, whereby the deformation is distributed over more dimensions.

In addition to the above, such rectilinear sections make possible to have a more reliable contact surface between the first impact absorption element and the first and second steel profiles during the deformation. Hence, the reinforcement will have the desired kinematic so as to reduce or even avoid that the parts slide and also to achieve a good level of absorbed energy.

In some embodiments, the upper and lower lobes are asymmetrical with respect to the central joining section such that an upper side of the upper lobe and a lower side of the lower lobe are divergent towards the first steel profile.

This arrangement of the upper and lower lobes makes possible to adapt the first impact absorption element to the channel and the profile of the rocker structure. Further, the divergence of the lobes towards the first steel profile makes possible to transform transversely oriented forces into forces with a vertical component, thereby avoiding intrusion in the transverse direction and increasing the energy absorbed by deformations in the vertical direction.

In some embodiments, the upper side of the upper lobe and the lower side of the lower lobe are made of two linear portions parallel and arranged on a same line separated by a curved central portion.

The shape of these sides of the lobes increases the strength of the sections thereof. The energy that the rocker structure may absorb is thus increased.

In some embodiments, the rocker structure further comprises a second impact absorption element placed between the central joining section and the first steel profile and(/or) between the central joining section and the second steel profile.

The provision of two impact absorption elements allows different thickness repartition and also allows to better adapt the rocker structure to different crash requirements.

The second impact absorption element may absorb most of the energy at the beginning of the impact, even though part of the energy is received at the first impact absorption element as well. The second impact absorption element absorbs most part of the energy at the centre of the rocker structure while it gets deformed; once it is completely deformed or breaks, the remaining energy is to be absorbed by the first impact absorption element. Overall, the two impact absorption elements may improve the amount of energy that the rocker structure may absorb.

In some embodiments, the second impact absorption element has a rectangular or square section.

Such geometry of the second impact absorption element may further improve the energy absorption capabilities thereof.

In some embodiments, the second impact absorption element is an MS1200, an MS1500 or an MS1700 martensitic automotive steel.

In some embodiments, the first impact absorption element is an MS1200, an MS1500 or an MS1700 martensitic automotive steel.

In some embodiments, the first and/or second profiles are made of HT1150.

In some embodiments, the rocker structure is adapted to have the first steel profile facing outwardly from the vehicle when the rocker structure is mounted on the vehicle. In these embodiments, the second steel profile is facing inwardly, i.e. towards the cabin of the vehicle, when the rocker structure is mounted on the vehicle.

In some other embodiments, the rocker structure is adapted to have the second steel profile facing outwardly from the vehicle when the rocker structure is mounted on the vehicle. In these embodiments, the first steel profile is facing inwardly, i.e. towards the cabin of the vehicle, when the rocker structure is mounted on the vehicle.

The rocker structure may be mounted on the vehicle in any of these two configurations. The rocker structure absorbs energy from impacts depending on how the first impact absorption element is arranged in the channel, and in those embodiments in which the rocker structure comprises a second impact absorption element, the energy absorption capabilities also depend on the arrangement of the second impact absorption element in the channel. In some embodiments the rocker structure further comprises:

a first plate comprising an upper portion and a lower portion, wherein the upper portion is between the upper joining flange of the first profile and the upper joining flange of the second profile, and wherein the lower portion of the first plate is fixed to a linear portion of the upper side of the upper lobe, and a second plate comprising an upper portion and a lower portion, wherein the lower portion is between the lower joining flange of the first profile and the lower joining flange of the second profile, and wherein the upper portion of the second plate is fixed to a linear portion of the lower side of the lower lobe.

In this way the first plate and the second plate may be used to fix the first impact absorption element to the first steel profile and to the second steel profile. This way of fixing presents the following advantages with respect to welding the first impact absorption element to one of the first and second steel profiles: a decrease in the cost of welding, an increase in the flexibility of the assembly stages that can be followed and it provides a joint between the first impact absorption element and the first and second profiles.

In case the rocker structure has a relatively long length, the number of holding plates can be increased in proportion to the length.

A second aspect of the invention relates to a method for obtaining a rocker structure for a vehicle in which a longitudinal direction, a transversal direction and a vertical direction are defined, so that the three directions are orthogonal to each other, which comprises the following steps:

a) providing a first steel profile such that therein a concavity, an upper joining flange and a lower joining flange are defined;

b) deforming a blank into a tubular profile (roll forming process) such that a first impact absorption element is obtained wherein an upper lobe and a lower lobe joined by a central joining section are defined;

c) joining the first impact absorption element to the first steel profile on the concavity side of the first steel profile;

d) providing a second steel profile such that therein a concavity, an upper joining flange and a lower joining flange are defined; and e) joining the first and second steel profiles, being joined therebetween by their upper and lower joining flanges so that a channel is defined between the two profiles wherein the first impact absorption element is arranged such that the upper lobe is located closer to the upper joining flanges, the lower lobe is located closer to the lower joining flanges.

With the present method it is possible to manufacture a rocker structure that has a reduced weight, and which has energy absorption capabilities that are suitable for motor vehicles in general, and also for EV and PHEV in particular.

The tubular profile is obtained with a roll forming process, for example. As the tubular profile has a closed profile, the resulting first impact absorption element also has a closed profile, therefore the latter needs not have two ends welded together for closing its perimeter; this is advantageous for both shortening the production times and improving the mechanical properties of the first impact absorption element. When the ends are joined together so as to close the profile, the affected portion may be mechanically weak, thus in an impact event the energy absorption thereof is negatively influenced.

In some embodiments of the method, the upper lobe has a portion adjacent to the central section of the first steel profile, and the lower lobe has a portion adjacent to the central section of the first steel profile and a portion adjacent to the central section of the second steel profile In some embodiments, the method further comprises, between steps b) and c), joining a second impact absorption element to the first steel profile.

In some embodiments, the method further comprises joining together two portions of the first impact absorption element that form the central joining section, said two portions being joined together by means of welding. In some of these embodiments, welding comprises one of: remote laser welding, remote spot welding or welding with roller.

In some embodiments, the first impact absorption element is joined to the first steel profile on the concavity side of the first steel profile by means of welding. In some of these embodiments, welding comprises remote laser welding or remote spot welding.

In some embodiments, the first and second steel profiles are joined such that a portion of the upper lobe is adjacent to the central section of the second steel profile. In some of these embodiments, the portion of the upper lobe adjacent to the central section of the second steel profile has a section complementary to the second profile, said portion of the upper lobe being joined to the second steel profile.

In some embodiments, the portion of the lower lobe adjacent to the central section of the second steel profile has a section complementary to the second profile, said portion of the lower lobe being joined to the second steel profile.

In some embodiments, each of the first and second steel profiles are provided having a Ω-shaped (i.e. uppercase-omega-shaped) section.

In some embodiments, the central joining section is rectilinear and parallel to the central sections of the first and second profiles.

In some embodiments, sections of the upper and lower lobes that join the central joining section to the portions adjacent to the central sections of the first and second steel profiles are rectilinear.

In some embodiments, the upper and lower lobes are asymmetrical with respect to the central joining section such that an upper side of the upper lobe and a lower side of the lower lobe are divergent towards the first steel profile.

In some embodiments, the upper side of the upper lobe and the lower side of the lower lobe are made of two linear portions parallel and arranged on a same line separated by a curved central portion.

In some embodiments, the method further comprises providing a second impact absorption element between the central joining section and the first steel profile and/or between the central joining section and the second steel profile. In some of these embodiments, the method further comprises joining the second impact absorption element to the first steel profile or the second steel profile by means of welding. In some of these embodiments, welding comprises remote laser welding or remote spot welding.

In some embodiments, the second impact absorption element has a rectangular or square section.

In some embodiments, the second impact absorption element is an MS1200, an MS1500 or an MS1700 martensitic automotive steel.

In some embodiments, the first impact absorption element is an MS1500 or an MS1700 martensitic automotive steel.

In some embodiments, the first and second profiles are made of HT1150.

In some embodiments, the rocker structure is adapted to have the first steel profile facing outwardly from the vehicle when the rocker structure is mounted on the vehicle. In these embodiments, the second steel profile is facing inwardly, i.e. towards the cabin of the vehicle, when the rocker structure is mounted on the vehicle.

In some other embodiments, the rocker structure is adapted to have the second steel profile facing outwardly from the vehicle when the rocker structure is mounted on the vehicle. In these embodiments, the first steel profile is facing inwardly, i.e. towards the cabin of the vehicle, when the rocker structure is mounted on the vehicle.

In some embodiments, the method further comprises mounting the rocker structure on a vehicle such that the first steel profile faces outwardly from the vehicle and the second steel profile faces inwardly towards a cabin of the vehicle. In some other embodiments, the method further comprises mounting the rocker structure on a vehicle such that the second steel profile faces outwardly from the vehicle and the first steel profile faces inwardly towards a cabin of the vehicle.

Similar advantages as those described for the first aspect of the invention are also applicable to this aspect of the invention.

A third aspect of the invention relates to a vehicle comprising a first rocker structure according to the first aspect of the invention at a first lateral side of the vehicle, and a second rocker structure according to the first aspect of the invention at a second lateral side of the vehicle.

In some embodiments, the vehicle is an electric vehicle (i.e. EV) or a plug-in hybrid electric vehicle (i.e. PHEV).

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures:

FIGS. 6A-6E and 7A-7E show simulated deformation processes of two rocker structures in accordance with embodiments.

FIG. 9 shows a practical embodiment of the invention as side components of a frame for side impact protection for batteries.

FIG. 10 shows the optimal arrangement of the batteries in the frame illustrated in FIG. 9, where the space between batteries and the inventive rocker beam is shown so that it can deform inwardly without damaging the battery.

In FIGS. 12A and 12B the first steel profile 1 is not shown in order to better see the inside of the rocker structure.

DESCRIPTION OF WAYS OF CARRYING OUT THE INVENTION

Figure 1:
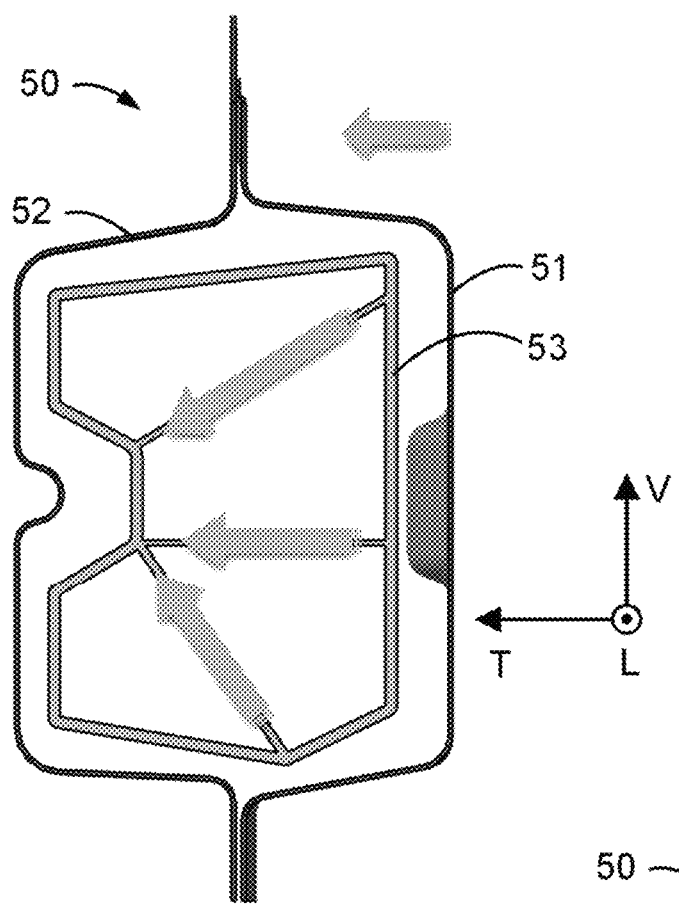
FIG. 1 diagrammatically shows a cross-section of a prior art rocker structure.

FIG. 1 diagrammatically shows a cross-section of a prior art rocker structure 50 for a vehicle.

The rocker structure 50 includes an outer part or structure, formed by two plates 51, 52 joined together so as to provide a cavity or channel, and an inner part or structure 53, which is the part or structure that absorbs most of the energy in an impact.

Reference axes are illustrated in FIG. 1: L for longitudinal axis, T for transverse axis, and V for vertical axis. Also, arrows indicating the load path, and though how energy is absorbed by the rocker structure 50 are shown in FIG. 1 for illustrative purposes.

When a collision occurs, for instance when a car impacts or crashes into the rocker structure 50 following the direction of the top most arrow, particularly into the outer plate 51 (i.e. the plate facing outwardly when the rocker structure 50 is mounted on a vehicle) of the outer part or structure, the energy of the collision is partly absorbed by the outer plate 51, but most of the energy is received at the inner part or structure 53. The energy is transmitted to and absorbed by the ribs of the inner part or structure 53 as shown with the arrows. As the ribs form, together with the wall of the inner part or structure 53, rough edges, that is to say, they do not form smooth transitions, such edge discontinuities negatively affect the energy absorption capabilities of the inner part or structure 53 and, thus, the energy absorption capabilities of the rocker structure 50. This is so because as the inner part or structure 53 is deformed owing to the impact, it mechanically withstands forces of a lower intensity (despite the remaining energy of the impact needs be absorbed) and the shape of the inner part or structure 53 becomes less effective for absorbing energy.

Once the inner part or structure 53 breaks, the rocker structure 50 cannot absorb much more energy, hence the remaining energy is transmitted to other parts of the vehicle, for example battery cells if the vehicle is an EV or an PHEV.

Figure 2:
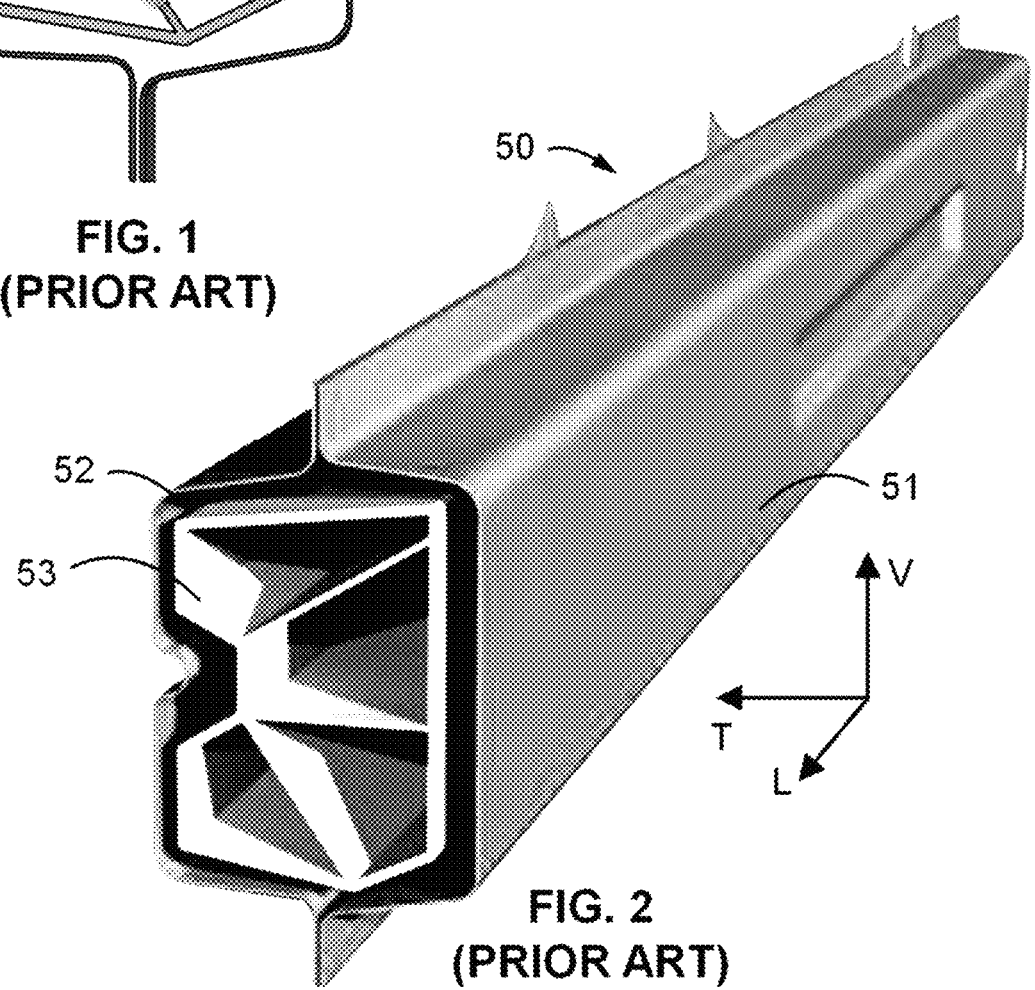
FIG. 2 shows, in perspective, the prior art rocker structure of FIG. 1.

FIG. 2 shows, in perspective, the prior art rocker structure 50 of FIG. 1.

As it may be appreciated, the rocker structure 50 extends a length in the L axis; when mounted on a vehicle, the length of the rocker structure 50 covers part of the side of the vehicle.

In addition to the aforementioned limitations described with reference to FIG. 1, the production of the inner part or structure 53 by means of extrusion results in a process for manufacturing the rocker structure 50 that is not cost-effective. Furthermore, it is readily apparent that the rocker structure 50 features a significant weight owing to the intricate shape of the inner part or structure 53, which is made of metal, thereby increasing the overall weight of the vehicle.

Figure 3:
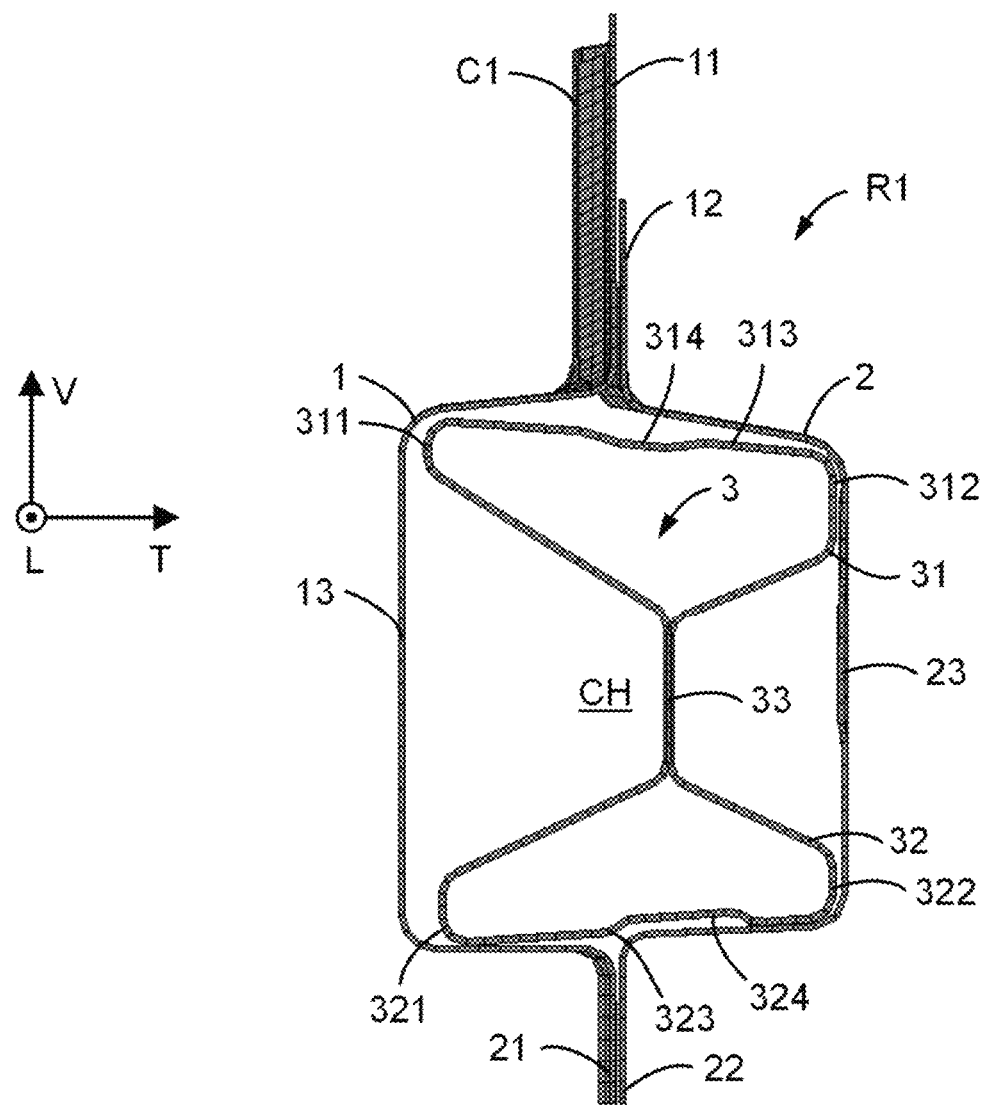
FIGS. 3-5 diagrammatically show cross-sections of rocker structures in accordance with embodiments.

FIG. 3 diagrammatically shows a cross-section of a rocker structure R1 in accordance with an embodiment.

The rocker structure R1 comprises a first steel profile 1 and a second steel profile 2, both of which extend along the L axis, thereby having a lengthwise dimension; when mounted on a vehicle, the lengthwise dimension of the rocker structure R1 covers part of the side of the vehicle. The first and second steel profiles 1, 2 may be steel plates or steel plate-shaped elements that are, for instance, made of HT1150.

The first and second steel profiles 1, 2 are arranged such that the concavities thereof provide a channel CH in the rocker structure R1. To this end, a first or upper joining flange 11 of the first steel profile 1 is joined to a first or upper joining flange 12 of the second steel profile 2, and a second or lower joining flange 21 of the first steel profile 1 is joined to a second or lower joining flange 22 of the second steel profile 2. Between the first or upper joining flanges 11, 12 and the second or lower joining flanges 21, 22 of the first and second steel profiles 1, 2 there are central sections 13, 23 that preferably, but not necessarily, are substantially parallel (forming an angle between −15° and 15°, the endpoints being included in the range) with said flanges 11, 12, 21, 22; also, preferably the central sections 13, 23 substantially extend (forming an angle between −15° and 15°, the endpoints being included in the range) along the V axis. When the rocker structure R1 is mounted on a vehicle, the V axis substantially corresponds to a vertical dimension of the vehicle. The flanges 11, 12, 21, 22 and the central sections 13, 23 are thus provided such that the concavities are defined in each of the first and second steel profiles 1, 2. In this embodiment, the first and second steel profiles are provided such that each features a Ω shape.

The rocker structure R1 further comprises, inside the channel CH, a first impact absorption element 3, which is a closed steel profile that also extends along the L axis. The first impact absorption element 3 is preferably provided by deforming a blank into a tubular body or profile into a shape having a first or upper lobe 31, a second or lower lobe 32, and a central joining section 33. The deformation of the tubular body or profile may be carried out by means of a press, for instance. As the tubular body or profile is a continuous and closed body, the resulting first impact absorption element 3 is a closed steel profile The first or upper lobe 31 is closer to the first or upper joining flanges 11, 12 than to the second or lower joining flanges 21, 22 of the first and second steel profiles 1, 2, whereas the second or lower lobe 32 is closer to the second or lower joining flanges 21, 22 than to the first or upper joining flanges 11, 12 of the first and second steel profiles 1, 2. The first or upper lobe 31 and the second or lower lobe 32 preferably, but not necessarily, have an equal or similar dimension (i.e. the area within the cross-section of one lobe is equal to the area within the cross-section of the other lobe or is between 80% and 120% of the area within the cross-section of the other lobe) so that the energy absorption of the rocker structure R1 is improved.

A first portion 311 of the first or upper joining flange 31 is adjacent to the central section 13 of the first steel profile 1, and a first portion 321 of the second or lower joining flange 32 is also adjacent to the central section 13. In this embodiment, a second portion 312 of the first or upper joining flange 31 is adjacent to the central section 23 of the second steel profile 2, and a second portion 322 of the second or lower joining flange 32 is also adjacent to the central section 23 of the second steel profile 2. Each of a first or upper side 313 of the first or upper lobe 31 and a first or lower side 323 of the second or lower lobe 32 has two linear parallel portions that are arranged on a same line separated by a curved central portion 314, 324.

As it may be appreciated in FIG. 3, the first or upper lobe 31 and the second or lower lobe 32 are asymmetrical with respect to the central joining section 33 such that the first or upper side 313 of the first or upper lobe 31 and the first or lower side 323 of the second or lower lobe 32 are divergent towards the first steel profile 1.

In this embodiment, the second portions 312, 322 of each the first or upper lobe 31 and the second or lower lobe 32 have a section that is complementary to the second steel profile 2. The provision of such section further improves the energy absorption capabilities of the rocker structure R1 by reinforcing the union between the first impact absorption element 3 and the second steel profile 2. Furthermore, in this embodiment, said second portions 312, 322 are joined to the second steel profile 2, for instance by means of welding, which also reinforces said union.

In this embodiment, the first steel profile 1 is outwardly facing when the rocker structure R1 is mounted on the vehicle, thus the second steel profile 2 is inwardly facing the vehicle when the rocker structure R1 is mounted on the vehicle. The first steel profile 1 may be part of a rocker panel of the vehicle, or it may be covered with a rocker panel.

Figure 4:
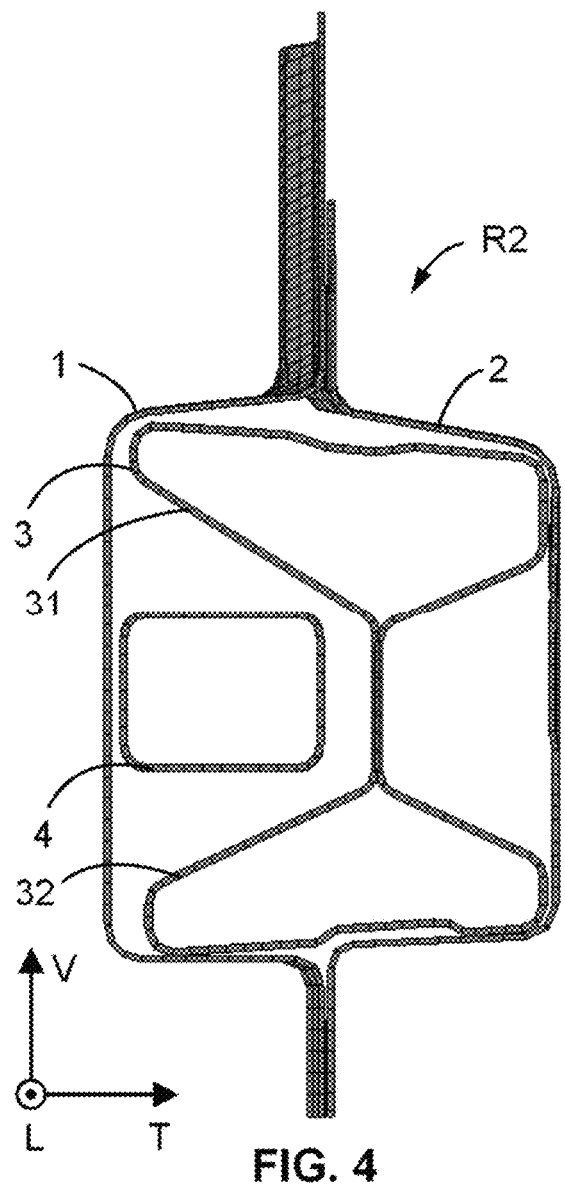

FIG. 4 diagrammatically shows a cross-section of a rocker structure R2 in accordance with an embodiment.

The rocker structure R2 is similar to the rocker structure R1 of FIG. 3 but, in contrast to the rocker structure R1, it further includes a second impact absorption element 4 arranged between the first steel profile 1 and the first impact absorption element 3; further, the second impact absorption element 4 is joined to the first steel profile 1, for instance by means of welding.

The second impact absorption element 4 is a closed steel profile whose cross-section features, for example but without limitation, a square or rectangular shape. The second impact absorption element 4 absorbs part of the energy upon receiving an impact from the first steel profile 1, and once said impact absorption element 4 breaks or is deformed due to the energy absorption, the remaining energy is to be absorbed by the first impact absorption element 3.

The use of the first and second impact absorption elements 3, 4 makes possible to further or more flexibly configure the rocker structure R2 to be adapted to different crash requirements.

Figure 5:
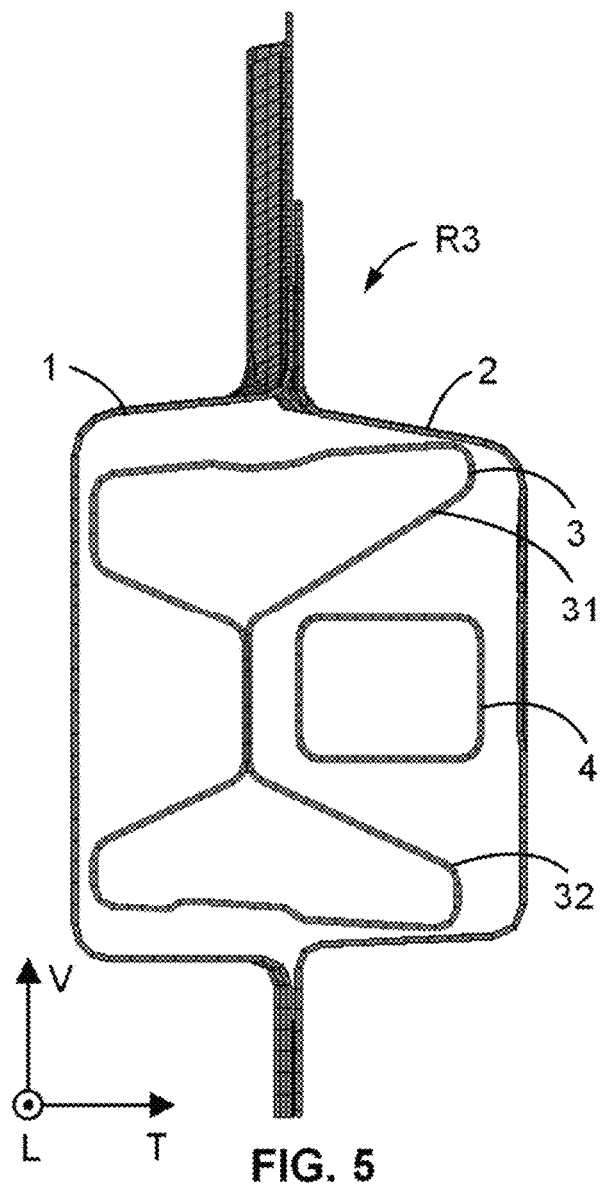

FIG. 5 diagrammatically shows a cross-section of a rocker structure R3 in accordance with an embodiment.

The rocker structure R3 is similar to the rocker structure R2 of FIG. 4 but, in contrast to the rocker structure R2, both the first impact absorption element 3 and the second impact absorption element 4 are arranged flipped with respect to the T axis. Accordingly, the second impact absorption element 4 is arranged between the first impact absorption element 3 and the second steel profile 2, and is joined to the latter 2 rather than to the first steel profile 1; and the first impact absorption element 3 is arranged such that, inter alia, the first or upper side 313 of the first or upper lobe 31 and the first or lower side 323 of the second or lower lobe 32 are divergent towards the second steel profile 2 instead of the first steel profile 1.

The first impact absorption element 3 of the rocker structure R3 has a portion of the first or upper lobe and/or a portion of the second or lower lobe joined to the first steel profile 1 rather than to the second steel profile 2.

In comparison with a prior art rocker structure such as the one of FIGS. 1-2, the channel of the rocker structures R1-R3 of FIGS. 3-5 is filled with less material yet the energy absorption of the rocker structures R1-R3 is not reduced, as shown next in FIGS. 6A-6E and 7A-7E, thanks to the design of the first impact absorption element 3 and the second impact absorption element 4 (in the rocker structures R2-R3) and the arrangement of the different parts of the rocker structures R1-R3.

FIGS. 6A-6E show a simulated deformation process of the rocker structure R2 of FIG. 4, the deformation process being simulated with finite element analysis. Particularly, FIG. 6A shows the rocker structure R2 prior to an impact or crash event, FIGS. 6B-6D show how the rocker structure R2 absorbs energy as it gets deformed, and FIG. 6E shows the rocker structure R2 after the impact or crash event.

The collision occurs from the left-side most part of the rocker structure R2, where the first steel profile 1 is located. As it can be appreciated in FIGS. 6B-6D, as both the first and second impact absorption elements 3, 4 are provided with smooth rounded edges, and hence the plastic deformation they are subjected to achieves a significant energy absorption.

In FIG. 6B it can be seen that the first impact absorption element 3 starts to absorb energy from the portions of both the first or upper lobe 31 and the second or lower lobe 32 as they contact the first steel profile 1 during the impact or crash; also, the second impact absorption element 4 starts to absorb energy at the middle part of the rocker structure R2, thus the impact energy is distributed over both impact absorption elements 3, 4. At the middle part, a large amount of energy is first absorb by the second impact absorption element 4 as it gets deformed while being supported by the central joining section of the first impact absorption element 3, as shown in FIG. 6C, which results in the transmission of energy to the first impact absorption element 3 at the central joining section for absorption of the same. At the same time, the first or upper lobe 31 and the second or lower lobe 32 of the first impact absorption element 3 are deformed such that the portions thereof adjacent to the second steel profile 2 get larger, thereby being shaped so as to further absorb energy.

As shown in FIG. 6C with a circle, a portion of the second or lower lobe 32 breaks and, hence, said portion collapses, but as seen in FIGS. 6D and 6E, the remaining portion of the second or lower lobe 32 does not completely collapse thereby absorbing part of the remaining energy at least until the remaining portion breaks, as shown with a circle in FIG. 6D. The first or upper lobe 31 of the first impact absorption element 3 gets deformed but does not break, as represented with the ellipse, as seen in FIGS. 6D-6E.

Figure 7A:
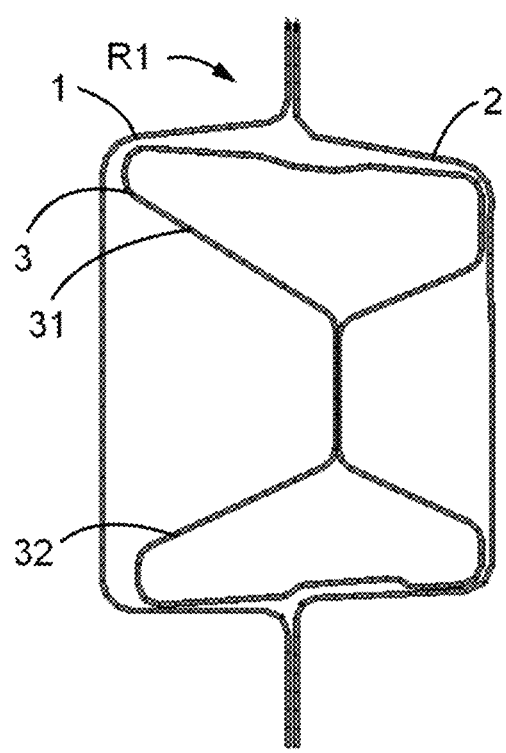
Figure 7B:
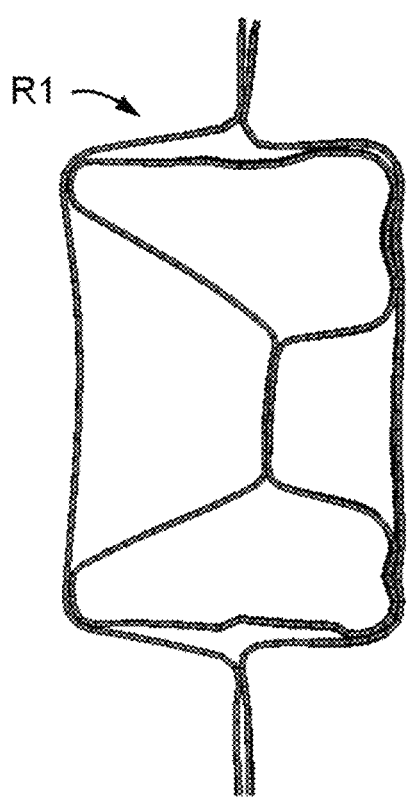
Figure 7C:
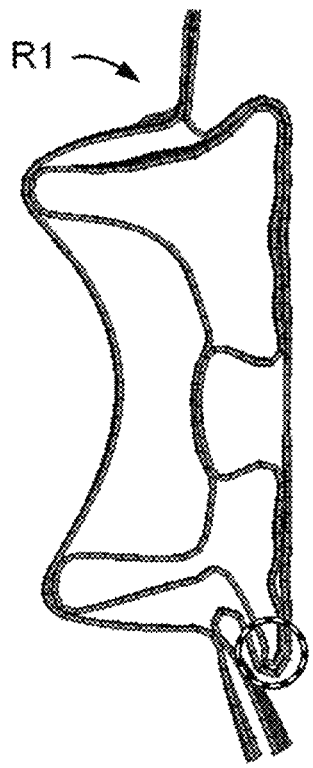
Figure 7D:
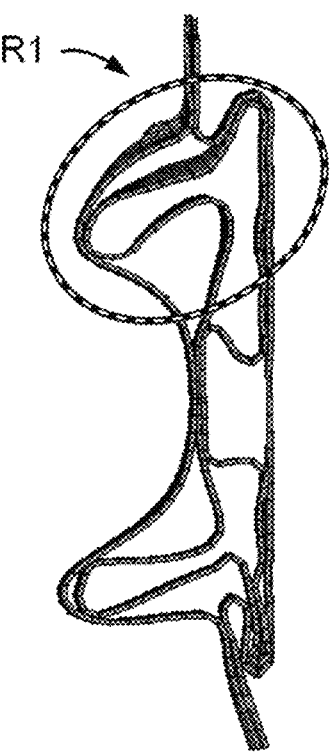
Figure 7E:
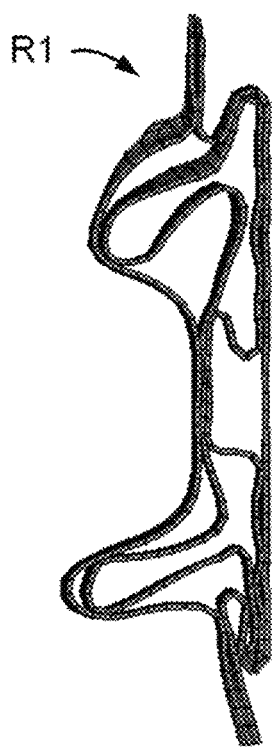

FIGS. 7A-7E show a simulated deformation process of the rocker structure R1 of FIG. 3, the deformation process being simulated with finite element analysis. Particularly, FIG. 7A shows the rocker structure R1 prior to an impact or crash event, FIGS. 7B-7D show how the rocker structure R1 absorbs energy as it gets deformed, and FIG. 7E shows the rocker structure R1 after the impact or crash event.

The collision occurs from the left-side most part of the rocker structure R1, where the first steel profile 1 is located. As it can be appreciated in FIGS. 7B-7D the first impact absorption elements 4 is provided with smooth rounded edges, and hence the plastic deformation it is subjected to achieves a significant energy absorption.

In FIG. 7B it can be seen that the first impact absorption element 3 starts to absorb energy from the portions of both the first or upper lobe 31 and the second or lower lobe 32 as they contact the first steel profile 1 during the impact or crash; the central joining section assists in the enlargement of the portions of the first or upper lobe 31 and the second or lower lobe 32 that are adjacent to the second steel profile 2.

As shown in FIG. 7C with a circle, a portion of the second or lower lobe 32 is capable of withstanding the energy absorption without breaking. As the energy absorption advances, as illustrated in FIG. 7D, the central joining section contacts the first steel profile 1 thereby further absorbing energy, whereas the first or upper lobe 32 is deformed (illustrated with an ellipse) but absorbs energy as well.

Figure 8:
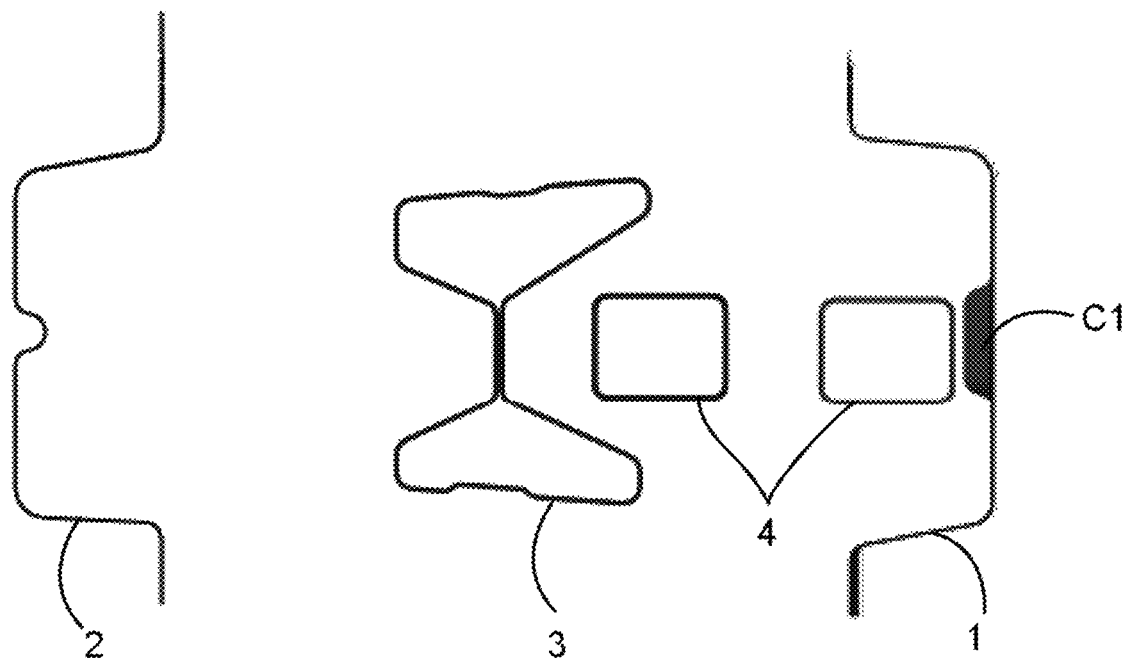
FIG. 8 diagrammatically shows the assembly of a rocker structure in accordance with an embodiment.

FIG. 8 diagrammatically shows the assembly of a rocker structure in accordance with an embodiment.

The rocker structure is provided with the first steel profile 1 and the second steel profile 2, which are joined together so as to provide a channel. The rocker structure is further provided with the first impact absorption element 3, and a second absorption impact element in the form of the second impact absorption element 4 described with reference to the embodiments of FIGS. 4 and 5; each of these impact absorption elements 3, 4 is within the channel. In particular, the additional impact absorption element 4 is arranged between the first impact absorption element 3 and the first steel profile 1.

FIG. 9 shows an application of the invention as side components R of a protective frame of the batteries of an electric vehicle. In the middle there is a structural battery B reinforced to withstand forces and avoid battery damage. The frame provides for an additional protection of the battery, by providing in all crash situations a maximum energy absorption and a minimum battery intrusion.

FIG. 10 shows the arrangement of battery B in relation to the frame. In particular, three zones can be seen, one corresponding to the location of the rocker beam (rocker absorption zone), a space destined to the reinforced battery (Battery rigid zone) and an area disposed between both (battery absorption zone), destined to be occupied by the rocker beam R when it is deformed due to a lateral impact, indicated by the Force Input arrow.

Figure 11A:
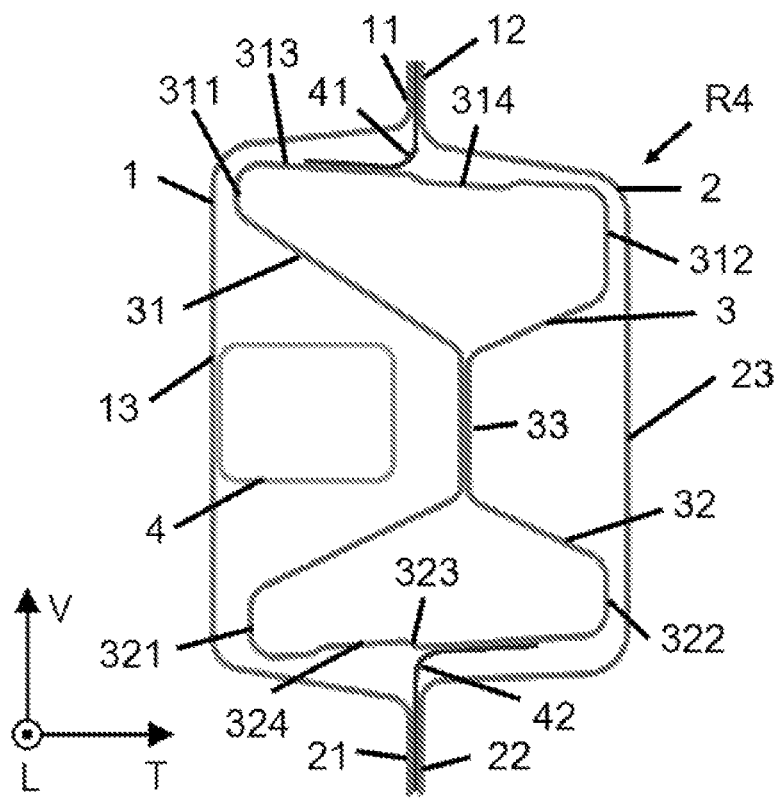
FIG. 11A diagrammatically shows a cross-section of a rocker structure in accordance with an embodiment.
Figure 11B:
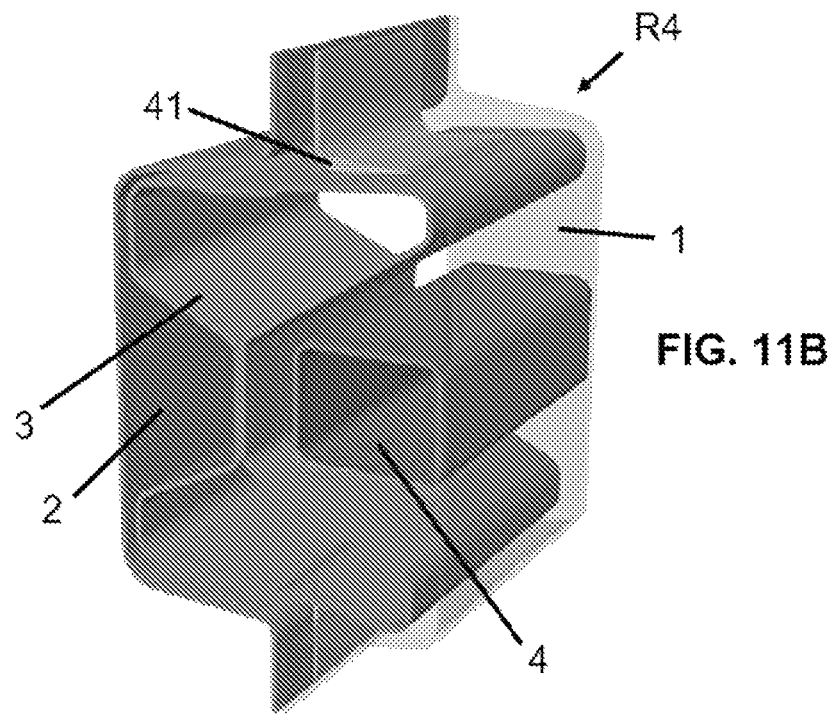
FIG. 11B diagrammatically shows a perspective view of a rocker structure in accordance with an embodiment.

FIGS. 11A and 11B disclose different views of the same embodiment of a rocker structure R4 in which a first plate 41 and a second plate 42 support the first impact absorption element 3.

A first plate 41 comprises a bent portion joining an upper portion extending in the vertical direction V and a lower portion extending in the transversal direction. The upper portion of the first plate 41 is fixed between the upper joining flange 12 of the second profile 2 and the upper joining flange 11 of the first profile 1. This fixture can be attained for example by means of welding the upper portion of the first plate 41 to the upper joining flange 12 and the upper joining flange 11. The lower portion of the first plate 41 is fixed to a linear portion of the upper side 313 of the upper lobe 31. This fixture can be attained for example by means of welding the lower portion of the first plate 41 to a linear portion of the upper side 313 of the upper lobe 31.

A second plate 42 comprises a bent portion joining a lower portion extending in the vertical direction and an upper portion extending in the transversal direction. The lower portion of the second plate 42 is fixed between the lower joining flange 22 of the second profile 2 and the lower joining flange 21 of the first profile 1. This fixture can be attained for example by means of welding the lower portion of the second plate 42 to the lower joining flange 22 and the lower joining flange 21. The upper portion of the second plate 42 is fixed to a linear portion of the lower side 323 of the lower lobe 32. This fixture can be attained for example by means of welding the upper portion of the second plate 42 to the linear portion of the lower side 323 of the lower lobe 32.

The curved central portion 314 of the upper lobe 31 separates linear portions of the upper side 313 of the upper lobe 31 such that a linear portion is closer the first profile 1 than another linear portion which closer the second profile 2. The curved central portion 324 of the lower lobe 32 separates linear portions of the lower side 323 of the lower lobe 32 such that a linear portion is closer the first profile 1 than another linear portion which is closer the second profile 2. The lower portion of the first plate 41 may be fixed to a linear portion of the upper lobe 31 which is closer the first profile 1. The upper portion of the second plate 42 may be fixed to a linear portion of the lower lobe 32 which is closer the second profile 2.

In case the parts to be joined are made of a material different from steel, the plates could be also joined with screws, bolts or equivalent discrete elements.

Figure 12A:
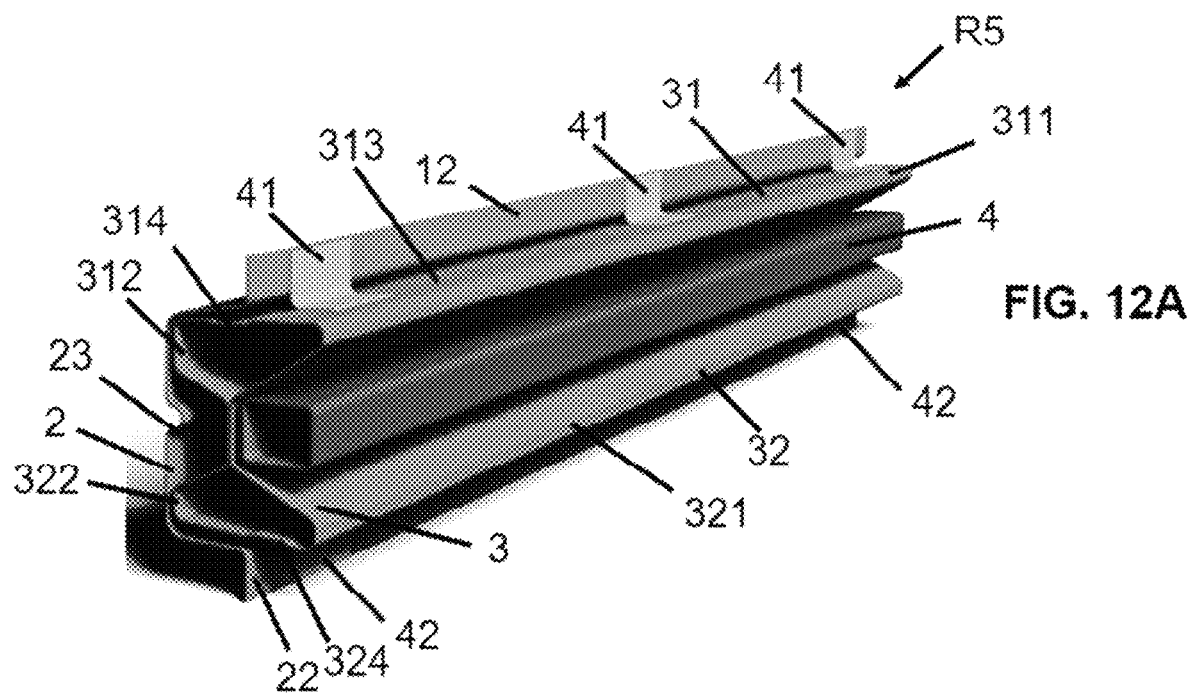
FIGS. 12A, 12B and 12C diagrammatically show different perspective views of a rocker structure in accordance with an embodiment.
Figure 12B:
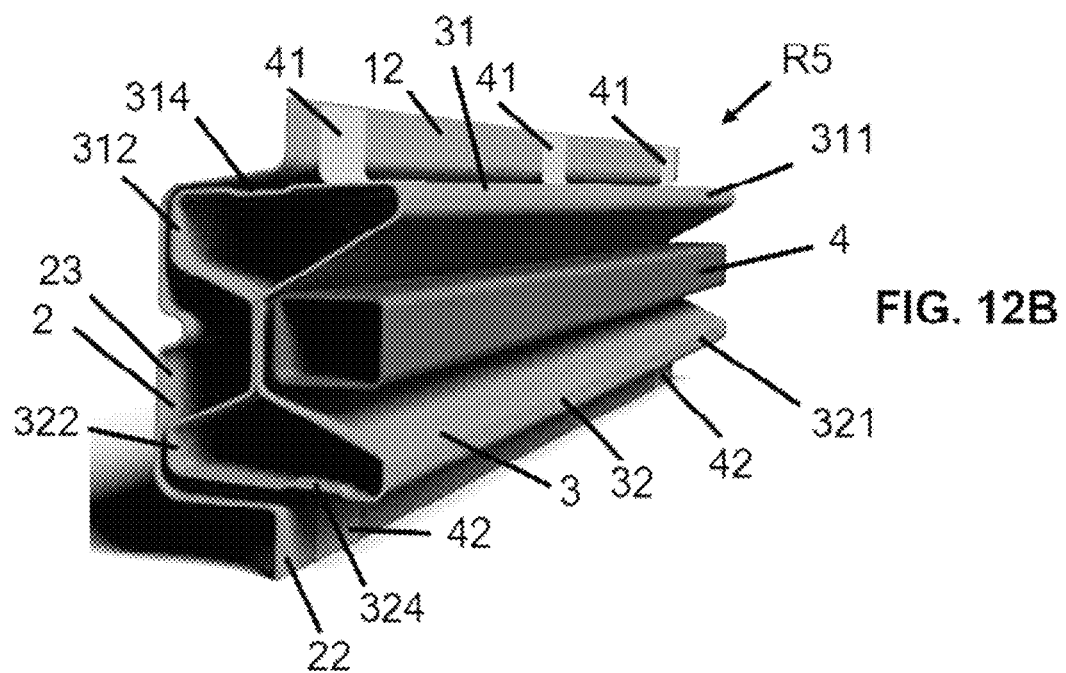
Figure 12C:
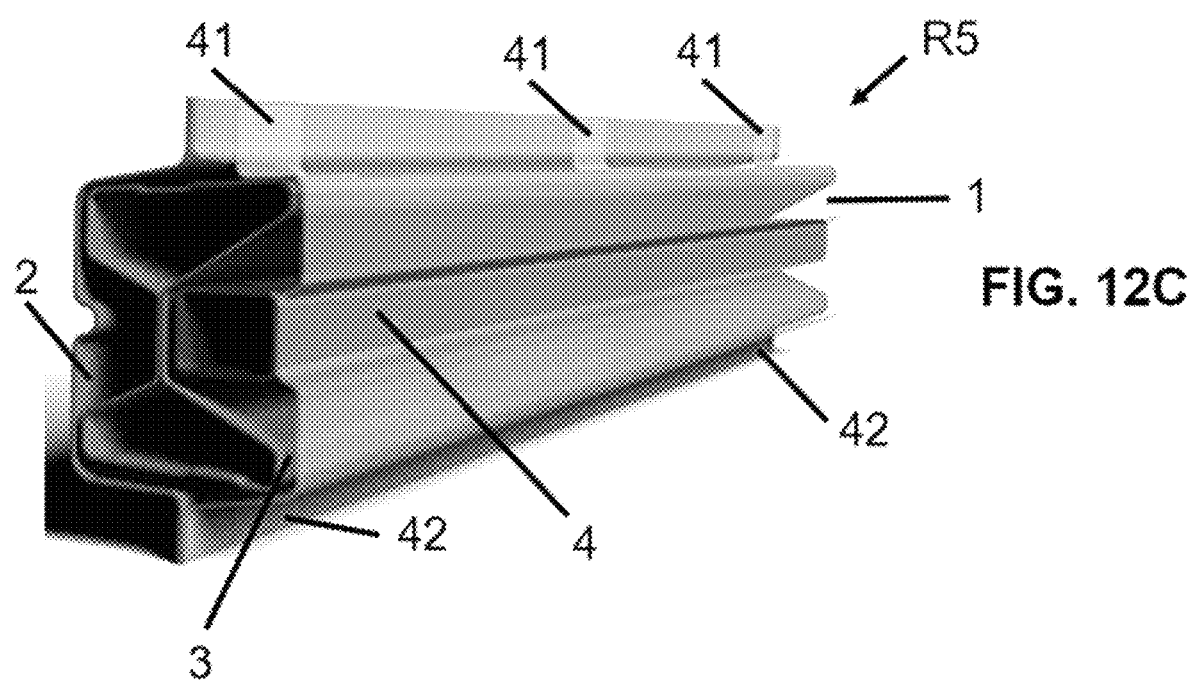

FIGS. 12A, 12B and 12C show different diagrammatic views of an embodiment of a rocker structure R5 comprising a plurality of first plates 41 and a plurality of second plates 42. The lower portion of the first plates 41 may be fixed to a linear portion of the upper lobe 31 which is closer the first profile 1 (not shown) than the second profile 2. The upper portion of the second plates 42 may be fixed to a linear portion of the lower lobe 32 which is closer the second profile 2 than the first profile 1 (not shown).

The rocker structure R5 comprises a three first plates 41: one placed in the front part of the rocker structure R5, another placed in the rear part of the rocker structure R5 and another between them. The rocker structure R5 comprises two second plates 42: one placed in the front part of the rocker structure R5 and another placed in the rear part of the rocker structure R5. The first plate 41 and the second plate 42 of the front part of the rocker structure R5 may be placed in the same vertical. The first plate 41 and the second plate 42 of the rear part of the rocker structure R5 may be placed in the same vertical.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A rocker structure for a vehicle, comprising:
a longitudinal direction;
a transversal direction; and
a vertical direction, wherein the longitudinal direction, the transverse direction, and the vertical direction are orthogonal to each other;
the rocker structure comprising:
   a first steel profile and a second steel profile wherein the rocker structure is mounted on the vehicle, and the first steel profile and the second steel profile have the longitudinal direction;
   wherein each of the first steel profile and the second steel profile have a concavity, an upper joining flange and a lower joining flange;
   the first steel profile and the second steel profile being joined therebetween by the upper joining flanges and the lower joining flanges;
   a channel is defined between the first steel profile and the second steel profiles;
   the first steel profile comprising a central section being substantially in the vertical direction;
   the second profile comprising a central section being substantially in the vertical direction; and
   the rocker structure further comprising a first impact absorption element arranged in the channel wherein the first impact absorption element is a closed steel profile;
   wherein an upper lobe and a lower lobe are joined by a central joining section;
   wherein the upper lobe being located closer to the upper joining flanges of the first steel profile and the upper joining flange of the second steel profile and the lower lobe being located closer to the lower joining flange of the first steel profile and the lower joining flange of the second steel profile; and
   wherein an upper side of the upper lobe and a lower side of the lower lobe being made of two linear portions parallel and arranged on a same line separated by a curved central portion.

2. The rocker structure according to claim 1, wherein the upper lobe has a first portion adjacent to the central section of the first steel profile, and the lower lobe has a second portion adjacent to the central section of the first steel profile and a third portion adjacent to the central section of the second steel profile.

3. The rocker according to claim 1, wherein a portion of the upper lobe is adjacent to the central section of the second steel profile and has a section complementary to the second steel profile, said portion of the upper lobe being joined to the second steel profile.

4. The rocker according to claim 1, wherein the central joining section is rectilinear and parallel to the central sections of the first steel profile and the central section of the second steel profile.

5. The rocker according to claim 1, wherein sections of the upper lobe and the lower lobes that join the central joining section to the first portions and the second portion adjacent to the central section of the first steel profile and the central section of the second steel profile are rectilinear.

6. The rocker according to claim 1, wherein the upper lobe and the lower lobe are asymmetrical with respect to the central joining section such that the upper side of the upper lobe and the lower side of the lower lobe are divergent towards the first steel profile.

7. The rocker according to claim 1, further comprising:
a second impact absorption element placed between the central joining section the first steel profile and/or between the central joining section and the second steel profile,
the second impact absorption element having a rectangular or square section.

8. The rocker according to claim 7, wherein the second impact absorption element is an MS1200, an MS1500 or an MS1700 martensitic automotive steel.

9. The rocker according to claim 1, wherein the first impact absorption element is an MS1500 or an MS1700 martensitic automotive steel.

10. The rocker according to claim 1, wherein the first steel profile and second steel profile are made of HT1150.

11. The rocker according to claim 1, wherein the rocker further comprises:
a first plate comprising an upper portion and a lower portion, wherein the upper portion is between the upper joining flange of the first steel profile and the upper joining flange of the second steel profile, and wherein the lower portion of the first plate is fixed to a linear portion of the upper side of the upper lobe, and
a second plate comprising an upper portion and a lower portion, wherein the lower portion is between the lower joining flange of the first profile and the lower joining flange of the second profile, and wherein the upper portion of the second plate is fixed to a linear portion of the lower side of the lower lobe.

12. A Method for obtaining a rocker structure for a vehicle in which a longitudinal direction, a transversal direction and a vertical direction are defined, so that the three directions are orthogonal to each other, the method comprising:
providing a first steel profile such that therein a concavity, an upper joining flange and a lower joining flange are defined;
deforming a blank into a tubular profile, by a roll forming process, such that a first impact absorption element is obtained wherein an upper lobe and a lower lobe joined by a central joining section are defined, and wherein an upper side of the upper lobe and a lower side of the lower lobe are made of two linear portions parallel and arranged on a same line separated by a curved central portion;

providing a second steel profile such that therein a concavity, an upper joining flange and a lower joining flange are defined;

joining the first impact absorption element to the second steel profile on the concavity side of the first steel profile; and joining the first steel profile and the second steel profile therebetween by their upper joining flanges and lower joining flanges so that a channel is defined between the first steel profile and the second steel profile wherein the first impact absorption element is arranged such that the upper lobe is located closer to the upper joining flanges and the lower lobe is located closer to the lower joining flanges.

13. The method according to claim 12, wherein the upper lobe has a first portion adjacent to the central section of the first steel profile, and the lower lobe has a first portion adjacent to the central section of the first steel profile and a second portion adjacent to the central section of the second steel profile.

14. The method according to claim 12, further comprising;

joining a second impact absorption element to the first steel profile.

15. The vehicle according to claim 1, wherein the vehicle comprises a first rocker structure at a first lateral side of the vehicle, and a second rocker structure at a second lateral side of the vehicle.

* * * * *

UNITED STATES PATENT AND TRADEMARK OFFICE
CERTIFICATE OF CORRECTION

PATENT NO. : 11,572,103 B2
APPLICATION NO. : 17/309466
DATED : February 7, 2023
INVENTOR(S) : Victor Nicolas Simon Limousin, Unai Lopategi Sanz and Quentin Benjamin Giraud du Poyet It is certified that error appears in the above-identified patent and that said Letters Patent is hereby corrected as shown below:

In the Claims

Claim 1, Column 13, Lines 44-45, "a channel is defined between the first steel profile and the second steel profiles;" should read --a channel defined between the first steel profile and the second steel profile;--.

Claim 4, Column 14, Lines 11-12, "to the central sections" should read --to the central section--.

Claim 5, Column 14, Line 14, "The rocker according to claim 1" should read --The rocker according to claim 2--.

Claim 5, Column 14, Line 15, "the upper lobe and the lower lobes" should read --the upper lobe and the lower lobe--.

Claim 5, Column 14, Line 16, "the first portions" should read --the first portion--.

Claim 7, Column 14, Lines 25-26, "between the central joining section the first steel profile" should read --between the central joining section and the first steel profile--.

Claim 12, Column 14, Line 53, "A Method" should read --A method--.

Claim 14, Column 15, Lines 21-22, "further comprising;" should read --further comprising:--.

Signed and Sealed this
Second Day of May, 2023

Katherine Kelly Vidal
*Director of the United States Patent and Trademark Office*